United States Patent [19]
Kolvereid

[11] Patent Number: 4,936,727
[45] Date of Patent: Jun. 26, 1990

[54] LOCKING NUT

[76] Inventor: Harald Kolvereid, Skellefteaveien 22, N-8610 Grubhei, Norway

[21] Appl. No.: 61,677

[22] Filed: Jun. 12, 1987

[30] Foreign Application Priority Data

Jun. 19, 1985 [NO] Norway ............................ 852465

[51] Int. Cl.$^5$ ............................................. F16B 39/12
[52] U.S. Cl. .................................. 411/237; 411/432; 411/935
[58] Field of Search ....................... 411/237, 432–433, 411/931, 935, 268, 269, 270

[56] References Cited

U.S. PATENT DOCUMENTS

| | | | |
|---|---|---|---|
| Re. 7,507 | 2/1877 | Naylor | 411/935 X |
| 490,585 | 1/1893 | McCormick | 411/935 X |
| 579,848 | 3/1897 | Thompson | 411/935 X |
| 597,823 | 1/1898 | Murphy | 411/935 X |
| 889,319 | 6/1908 | Martin | 411/268 |
| 1,137,042 | 4/1915 | Willison . | |
| 1,806,506 | 5/1931 | Savidge | 411/237 |
| 2,575,641 | 11/1951 | Summers . | |
| 2,621,697 | 12/1952 | McPherson . | |
| 2,742,938 | 4/1956 | Neuschotz . | |

FOREIGN PATENT DOCUMENTS

| | | |
|---|---|---|
| 504960 | 7/1920 | France . |
| 561696 | 10/1923 | France . |
| 666155 | 9/1929 | France . |
| 1053781 | 2/1954 | France . |
| 162115 | 4/1921 | United Kingdom . |
| 1279212 | 6/1972 | United Kingdom . |

Primary Examiner—Neill R. Wilson
Attorney, Agent, or Firm—Barnes & Thornburg

[57] ABSTRACT

A locking nut is disclosed for locking engagement with an element such as a bolt, rod, stud or the like, the element having a cylindrical screw-threaded outer surface. The locking nut includes a main nut having a thread for engaging the cylindrical screw-threaded outer surface of the element. A cylindrical sleeve integrally contiguous to a first end of the main nut extends longitudinally therefrom. The sleeve has a cylindrically threaded interior surface for engagement with the outer surface of the element to permit longitudinal motion of the sleeve along the outer surface of the element. The cylindrical sleeve also has a cylindrically screw-threaded exterior surface, coaxial with the cylindrical sleeve interior surface, the threading on the sleeve exterior surface having a greater flank angle than the threading on the sleeve interior surface. A secondary nut threadedly engages the sleeve exterior surface, the secondary nut having a first end confronting the first end of the main nut. The secondary nut is carried by the cylindrical sleeve and is longitudinally movable with respect to the sleeve into an abutting relation with the main nut first end. Further rotation of the secondary nut subsequent to the initial abutting relation causes a force to be transmitted through radial compression of the cylindrical sleeve to the element outer surface for securing the cylindrical sleeve against longitudinal motion along the element outer surface with a user determined clamping force.

5 Claims, 2 Drawing Sheets

LOCKING NUT

CROSS REFERENCE TO RELATED APPLICATIONS

This is a continuation of PCT Application No. N086/00039, filed June 17, 1986.

This invention relates to a nut which can be locked on to a bolt.

There is today on the market a number of systems, the purpose of which is to increase the friction between nut and bolt or between nut and support. Such systems are "Ny-loc" nuts, castellated nuts, lock washers, etc. All these systems have in common that none markedly increases the torque which is necessary to loosen the nut from the bolt.

Representative examples of earlier locknut designs, such as McCormick U.S. Pat. No. 490,585, require a tapered sleeve, integral with a main nut, lockingly engaged with a nut threaded internally and tapered to correspond to the taper of the sleeve. A radially compressive force of a secondary locking nut tightly binds the sleeve to the bolt. The secondary nut does not generally exert a force against the body of the main nut.

Neuschotz U.S. Pat. No. 2,742,938 is an example of a locking nut with a cylindrical sleeve that is locked by the action of a bolt threaded into the sleeve. The sleeve contracts after engaging an outer shell, locking the sleeve to the bolt. This design is only effective when the outer shell is securely buttressed and there is no need for an independent control of the locking force.

The present invention consists of a locking nut for locking engagement with a bolt, stud, or other similar workpiece having a cylindrical, screw-threaded outer surface. The locking nut includes a main nut having a thread for engaging the cylindrical screw-threaded outer surface of the bolt. Contiguous to a first end of the main nut is a cylindrical sleeve that extends longitudinally along the bolt. The cylindrical sleeve has a threaded interior surface that engages the outer surface of the bolt. This permits longitudinal motion of the sleeve along the outer surface of the bolt. The cylindrical sleeve also has a screw-threaded exterior surface coaxial with the cylindrical sleeve interior surface coaxial with the cylindrical sleeve interior surface.

A secondary nut threadedly engages the exterior surface of the cylindrical sleeve. The secondary nut has a first end confronting the first end of the main nut. The secondary nut is carried by the cylindrical sleeve and is longitudinally movable along the sleeve. The secondary nut can be moved along the sleeve until the secondary nut comes into an abutting relation with the main nut first end. This abutting relation causes a locking force to be transmitted through the cylindrical sleeve to the bolt. The main nut is secured against longitudinal motion along the bolt with a user determined clamping force.

With the locking nut according to this invention, the user can himself adjust how well the nut will sit, by choosing the design and the stud torque.

The invention may be understood in reference to a particular embodiment of the invention presented in the drawings. In the drawings.

Figure 1:
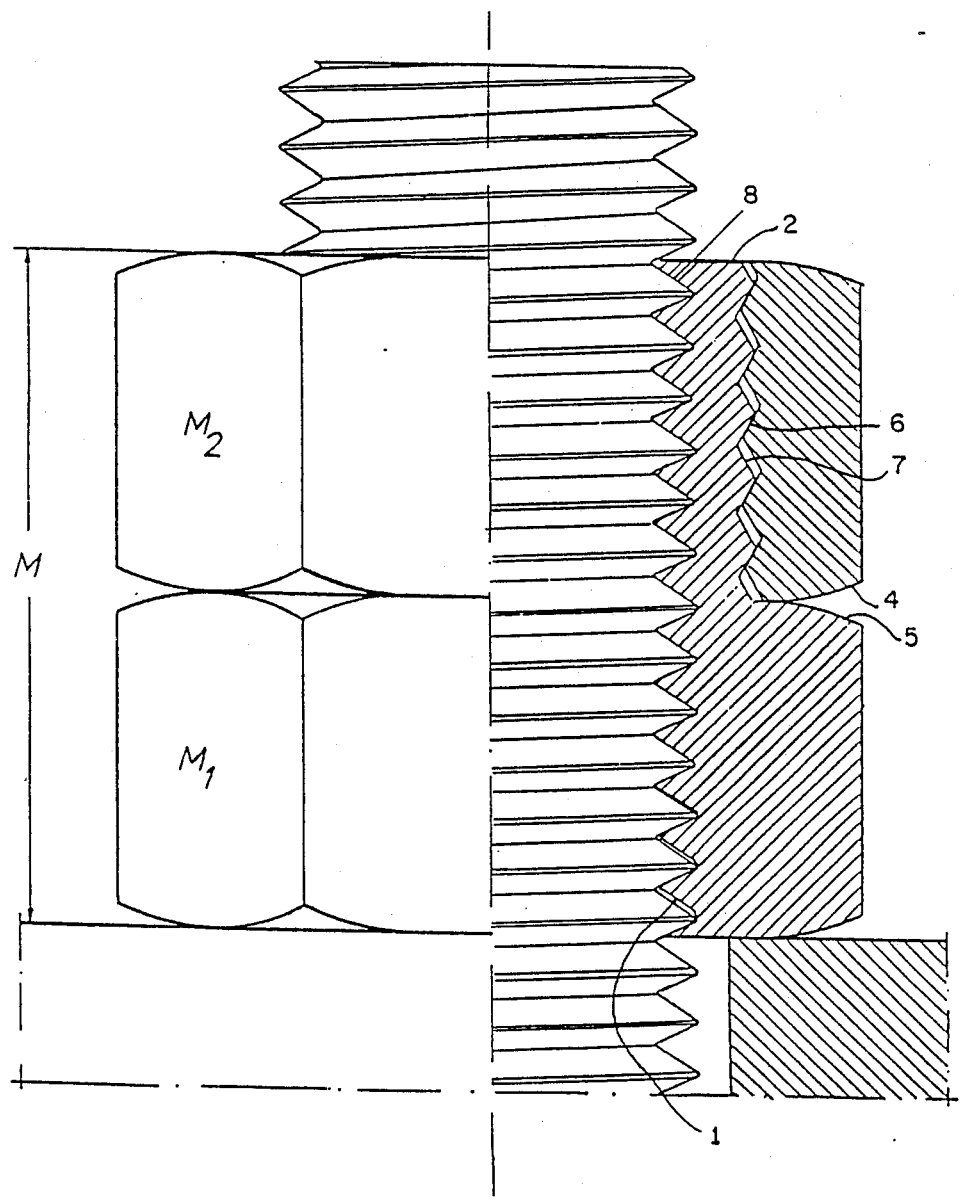
FIG. 1 is fragmentary sectional view of an apparatus constructed according to the invention with the sleeve integral to the main nut.

According to the illustrated embodiment of the invention shown in FIG. 1, the locking nut (M) consists of a main nut with integral sleeve ($M_1$) and a secondary nut ($M_2$), where ($M_2$) is screwed on to ($M_1$). FIG. 1 shows the secondary nut $M_2$ threaded onto sleeve 2 of the main nut $M_1$. This forms an abutting relation between the first end 5 of the main nut $M_1$, and the first end 4 of the secondary nut $M_2$. Tightening the secondary nut $M_2$ against the bolt transmits a locking force through the relative displacement of interior threads 6 against exterior sleeve threads 7. The locking is accomplished by the relative displacement of the exterior threads of the bolt 1 against the interior threads 8 of the sleeve. No alteration of the bolt is required to securely lock the main nut $M_1$ to the bolt. The friction obtained between the nut ($M_1$) and the through bolt is dependent on the stud torque.

Figure 2:
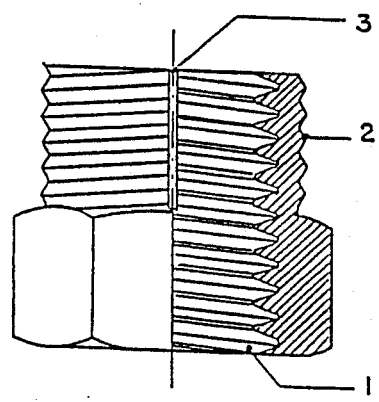
FIG. 2 is a fragmentary sectional view of the main nut with integral sleeve.
Figure 3:
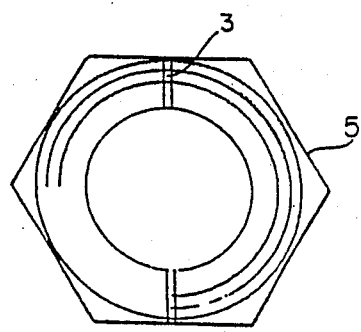
FIG. 3 is a top plan view of the secondary nut.

In order to obtain a higher locking force with a lesser stud torque, the outer threaded part of the main section ($M_1$) can be axially slotted, as shown in FIG. 2, slot 3.

The invention has several advantages over known methods. No alteration of the bolt is required, as for example drilling of holes or cutting of slots. The bolt is not damaged by the locking process. The nut can be locked after tightening of the bolt, or it can be locked without the bolt being tightened, etc.

What is claimed is:

1. A locking nut for locking engagement with an element such as a bolt, rod, stud or the like, the element having a cylindrical screw-threaded outer surface, the locking nut comprising:

a main nut including a thread for engaging the cylindrical screw-threaded outer surface of the element;

a cylindrical sleeve contiguous to and integral with a first end of the main nut and extending longitudinally therefrom toward a distal end, the sleeve having a cylindrically threaded interior surface for engagement with the outer surface of the element to permit longitudinal motion of the sleeve along the outer surface of the element, the threading on the sleeve interior surface involving a first average flank angle, a cylindrically screw-threaded exterior surface coaxial with the cylindrical sleeve interior surface, and at least one longitudinal slot extending from the distal end of the sleeve toward the main nut to permit radial clamping of the sleeve; and a secondary nut having a cylindrical threaded bore threadedly engaging the sleeve exterior surface, the threading in the secondary nut bore involving a second average flank angle of about twice the flank angle of the threading on the sleeve interior surface, the secondary nut having a first end confronting the first end of the main nut, the secondary nut being carried by the cylindrical sleeve and freely and longitudinally movable with respect thereto into an abutting relation with the main nut first end, the abutting relation causing a force to be transmitted through the cylindrical sleeve to the element outer surface for securing the cylindrical sleeve of the main nut against longitudinal motion along the element outer surface with a user determined clamping force.

2. A locking nut according to claim 1 wherein the second average flank angle is about 60°.

3. A locking nut for locking engagement with an element such as a bolt, rod, stud or the like, the element having a cylindrical screw-threaded outer surface, the locking nut comprising:
  a main nut including a thread for engaging the cylindrical screw-threaded outer surface of the element;
  a cylindrical sleeve contiguous to a first end of the main nut and extending longitudinally therefrom, the sleeve having a cylindrically threaded interior surface for engagement with the outer surface of the element to permit longitudinal motion of the sleeve along the outer surface of the element, the threading on the sleeve interior surface involving a first average flank angle, the cylindrical sleeve having a cylindrically screw-threaded exterior surface coaxial with the cylindrical sleeve interior surface, the threading on the sleeve exterior surface involving a second average flank angle of about twice the flank angle of the threading on the sleeve interior surface; and
  a secondary nut having a cylindrical threaded bore threadedly engaging the sleeve exterior surface, the secondary nut having a first end confronting the first end of the main nut, the secondary nut being carried by the cylindrical sleeve and freely and longitudinally movable with respect thereto into an abutting relation with the main nut first end, the further rotation of the secondary nut subsequent to the initial abutting relation causing a force to be transmitted through radial compression of the cylindrical sleeve to the element outer surface for securing the cylindrical sleeve against longitudinal motion along the element outer surface with a user determined clamping force.

4. A locking nut according to claim 3 wherein the first average flank angle is about 30° and the second average flank angle is about 60°.

5. A locking nut for locking engagement with an element such as a bolt, rod, stud or the like, the element having a cylindrical screw-threaded outer surface, the locking nut comprising:
  a main nut including a bore defining an axis, the bore having a thread for engaging the cylindrical screw-threaded outer surface of the element and a first end face substantially perpendicular to the axis of the bore;
  a cylindrical sleeve contiguous to and integral with the first end of the main nut and extending longitudinally therefrom toward a distal end, the bore within the main nut continuing through the sleeve including the thread for engaging the outer surface of the element to permit movement of the sleeve along the outer surface of the element, the threading in the bore involving a first average flank angle, the sleeve having an exterior surface coaxial with the bore and cylindrically threaded at a second average flank angle of about twice the first average flank angle and at least one longitudinal slot extending from the distal end of the sleeve toward the main nut to permit radial clamping of the sleeve; and
  a secondary nut having a cylindrically threaded interior surface threadedly engaging the sleeve exterior surface, the secondary nut having a first end confronting the first end face of the main nut, the secondary nut being carried by the cylindrical sleeve and freely and longitudinally movable with respect thereto into an abutting relation with the main nut first end face, the further rotation of the secondary nut subsequent to the initial abutting relation causing a force to be transmitted through the interaction between the threads of the secondary nut and the threads on the sleeve exterior surface to radially compress the cylindrical sleeve to the element outer surface for securing the cylindrical sleeve against longitudinal motion along the element outer surface with a user determined clamping force.

* * * * *

UNITED STATES PATENT AND TRADEMARK OFFICE
CERTIFICATE OF CORRECTION

PATENT NO. : 4,936,727

DATED : June 26, 1990

INVENTOR(S) : Kolvereid

It is certified that error appears in the above-identified patent and that said Letters Patent is hereby corrected as shown below:

On the bibliography page, under "Foreign Application Priority Data", after "Norway", replace "852465" with --852464--.

Signed and Sealed this

Seventeenth Day of September, 1991

Attest:

HARRY F. MANBECK, JR.

*Attesting Officer*    Commissioner of Patents and Trademarks